US012544299B2

(12) United States Patent
Zhao et al.

(10) Patent No.: US 12,544,299 B2
(45) Date of Patent: Feb. 10, 2026

(54) MASSAGE CHAIR

(71) Applicant: Ruiduo (Shanghai) Intelligent Technology Co., Ltd., Shanghai (CN)

(72) Inventors: Bing Zhao, Shanghai (CN); Haitang Lai, Shanghai (CN); Cheng Fan, Shanghai (CN); Fawen Luo, Shanghai (CN)

(73) Assignee: Ruiduo (Shanghai) Intelligent Technology Co., Ltd., Shanghai (CN)

( * ) Notice: Subject to any disclaimer, the term of this patent is extended or adjusted under 35 U.S.C. 154(b) by 498 days.

(21) Appl. No.: 18/178,061

(22) Filed: Mar. 3, 2023

(65) Prior Publication Data

US 2024/0050305 A1 Feb. 15, 2024

(30) Foreign Application Priority Data

Aug. 10, 2022 (CN) ........................ 202210956878.7

(51) Int. Cl.
*A61H 15/00* (2006.01)

(52) U.S. Cl.
CPC . *A61H 15/0078* (2013.01); *A61H 2015/0035* (2013.01); *A61H 2201/0149* (2013.01)

(58) Field of Classification Search
CPC ........ A61H 15/0078; A61H 2201/0149; A61H 1/003; A61H 1/005
See application file for complete search history.

(56) References Cited

U.S. PATENT DOCUMENTS 7,380,881 B2 * 6/2008 Freed ..................... A47C 1/023 297/337
10,500,434 B2 * 12/2019 Hsieh ..................... A61H 1/005
(Continued)

FOREIGN PATENT DOCUMENTS

CN 202761639 U 3/2013
CN 205054767 U 3/2016
(Continued)

OTHER PUBLICATIONS

First Office Action issued in counterpart Chinese Patent Application No. 202210956878.7, dated Apr. 11, 2025.
(Continued)

*Primary Examiner* — Justine R Yu
(74) *Attorney, Agent, or Firm* — Westbridge IP LLC

(57) ABSTRACT

A massage chair relates to the technical field of passive exercise equipment. It includes a seat and a driving device arranged under the seat. The driving device includes a base plate, a connecting frame, an up-and-down vibration device and a four-bar linkage device. A connecting rod is fixed on the bottom of the seat, and the connecting rod is hinged with the connecting frame. The up and down vibration device and the four-bar linkage device are set on the base plate, and the bottom of the up-and-down vibration device is connected with the connecting frame. Through the setting of the up-and-down vibration device, the bottom bracket of the massage chair can drive the massage chair to realize the overall up-and-down vibration action. Meanwhile, the four-bar linkage device ensures that the seat can be stably supported by the connecting frame, and at the same time, the four-bar linkage device can ensure that the vibration frequencies at the four fulcrum positions are consistent.

9 Claims, 7 Drawing Sheets

(56) References Cited

U.S. PATENT DOCUMENTS

| | | | | |
|---|---|---|---|---|
| 11,413,200 | B2 * | 8/2022 | Chu | A61G 7/1059 |
| 2003/0055365 | A1 * | 3/2003 | Hazard | A61H 9/0085 601/103 |
| 2007/0208282 | A1 * | 9/2007 | Huang | A61H 1/005 601/30 |
| 2007/0259758 | A1 * | 11/2007 | Zeng | A63B 23/08 482/79 |
| 2018/0178690 | A1 * | 6/2018 | Castillo | B60N 2/501 |
| 2020/0000669 | A1 | 1/2020 | Tsai | |
| 2021/0030608 | A1 * | 2/2021 | Brown | A61G 5/0825 |

FOREIGN PATENT DOCUMENTS

| | | | |
|---|---|---|---|
| CN | 110353939 | A | 10/2019 |
| CN | 210643337 | U | 6/2020 |
| CN | 113509366 | A | 10/2021 |
| CN | 113576827 | A | 11/2021 |
| CN | 114587915 | A | 6/2022 |
| CN | 219332381 | U | 7/2023 |
| JP | 3231045 | U | 3/2021 |

OTHER PUBLICATIONS

International Search Report and Written Opinion issued in corresponding PCT Application No. PCT/CN2022/139006, dated Feb. 22, 2023.

* cited by examiner

MASSAGE CHAIR

TECHNICAL FIELD

The invention relates to the technical field of passive exercise equipment, in particular to a massage chair.

BACKGROUND TECHNIQUE

Massage chairs use mechanical rolling force and mechanical extrusion to perform massage. Manual massage can dredge meridians, circulate Qi and blood, and maintain the balance of Yin and Yang in the body. Therefore, after massage, one can feel muscle relaxed and joint flexibility. It makes people refreshed, eliminates fatigue, and plays an important role in ensuring physical health.

In the massage chairs given in the existing technology, such as the Chinese invention application CN113509366A, the bottom frame of the massage chair can generally only support and fine-tune the seat of the massage chair, and the massage and movement functions of the massage chair are concentrated on the seat.

Therefore, the structure of the massage chair determines that the massage chair cannot drive the human body to perform continuous overall movement and massage.

CONTENTS OF THE INVENTION

In order to realize that the massage chair can drive the human body to perform overall movement, the present invention provides a massage chair, and the technical solution of which is as follows.

The massage chair includes a seat and a driving device arranged under the seat. The driving device includes a base plate, a connecting frame, an up-and-down vibration device and a four-bar linkage device. The bottom of the seat is fixed with a connecting rod and rolling wheels. The connecting rod is hinged with the connecting frame. The surface of the rolling wheels rolls to be in contact with the connecting frame. The up-and-down vibration device and the four-bar linkage device are arranged on the base plate. The bottom of the up-and-down vibration device is connected with the connecting frame. The four-bar linkage device is hinged with the connecting frame. The up-and-down vibration device drives the connecting frame to move.

The up-and-down vibration device includes a power device and an eccentric mechanism. The power device drives the eccentric mechanism to move. The eccentric mechanism includes an eccentric wheel, a drive shaft and a connecting piece. The eccentric wheel is fixedly mounted on the drive shaft, and the eccentric wheel drives the connecting piece to move up and down. The power device drives the drive shaft to rotate and the drive shaft drives the eccentric wheel to rotate.

The eccentric mechanism also includes a swinging base, and the swinging base has two bearing holes, one of which is connected with the connecting piece through a bearing and a shaft shoulder screw. The eccentric wheel is connected with the other bearing hole through the bearing.

A driven wheel is also arranged on the drive shaft, and the driven wheel is connected with the power device through a synchronous belt.

The four-bar linkage device includes a cross-bar and at least two V-shaped rods. The V-shaped rod includes a short side and a long side. The two ends of the cross-bar are respectively hinged with the short side of the V-shaped rod.

The middle of the V-shaped rod is hinged with the base plate. The long side of the V-shaped rod is hinged with the connecting frame.

At least two four-bar linkage devices are arranged on the base plate.

At least two eccentric wheels are arranged on the drive shaft.

A foot cup is arranged under the base plate.

A pressure sensor is arranged on the seat.

The Advantages of this Method can be Derived from the Above Description:

Through the setting of the up-and-down vibration device, the bottom bracket of the massage chair can drive the massage chair to realize the overall up-and-down vibration action. Meanwhile, the four-bar linkage device ensures that the seat can be stably supported by the connecting frame, and at the same time, the four-bar linkage device can ensure that the vibration frequencies at the four fulcrum positions are consistent.

Reference signs: 1 base plate, 2 connecting frame, 3 up-and-down vibration device, 4 four-bar linkage device, 41 V-shaped rod, 42 cross-bar, 5 rolling wheel, 6 power device, 7 eccentric mechanism, 71 eccentric wheel, 72 drive shaft, 73 connecting piece, 74 swinging base, 75 driven wheel, 8 connecting rod, 9 foot cup, A seat, A1 pressure sensor.

SPECIFIC EMBODIMENT

Figure 1:
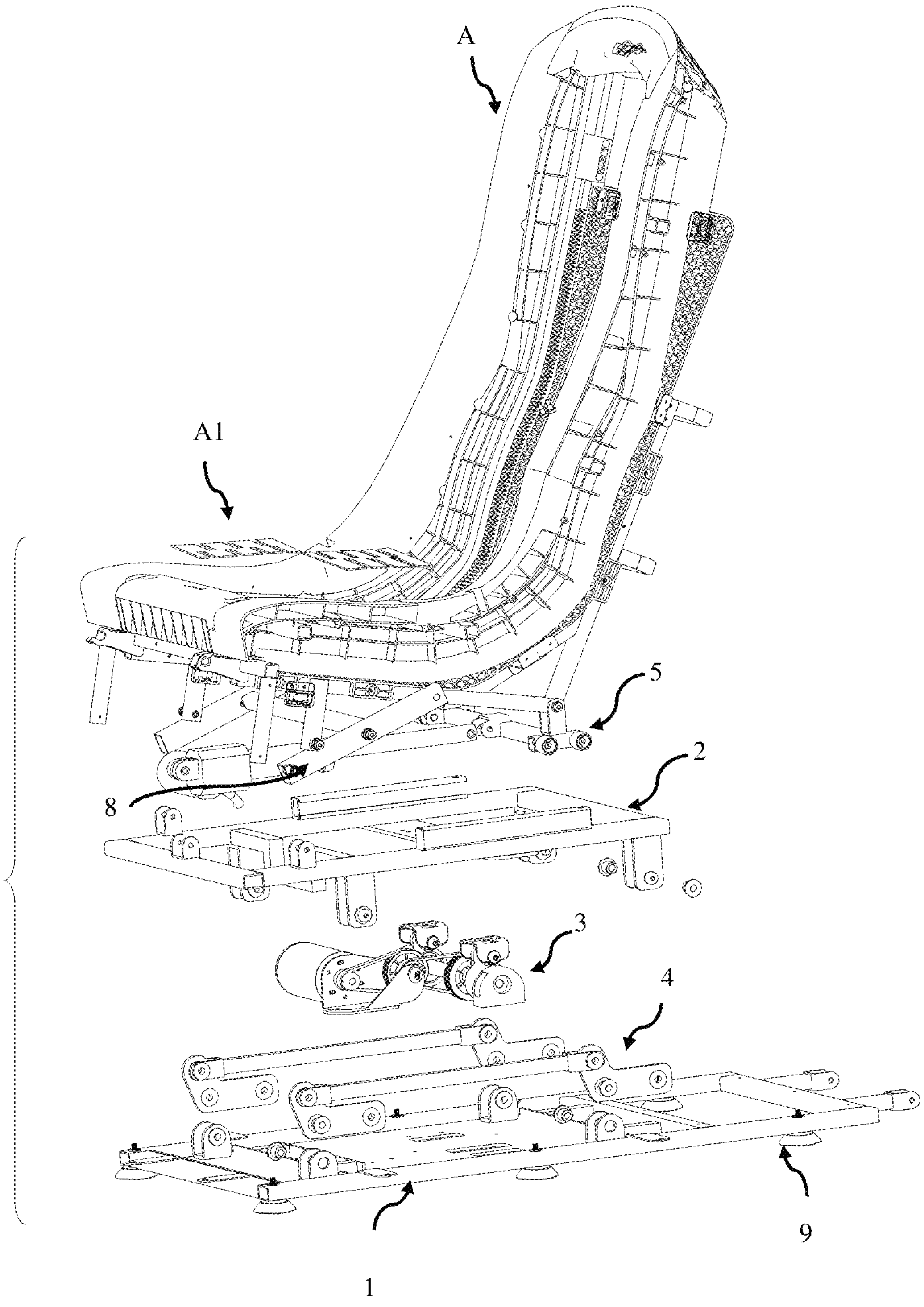
FIG. 1 is the overall explosion diagram of the massage chair.
Figure 2:
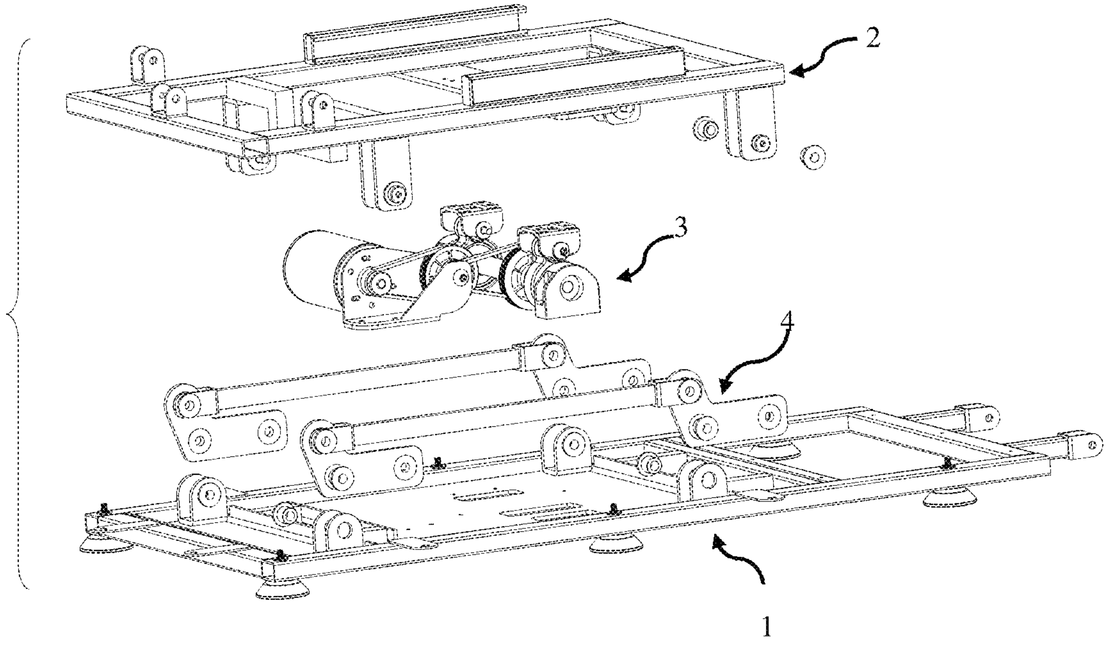
FIG. 2 is the overall explosion diagram of the driving device.

In order to achieve the above technical objectives, the technical solution of the present invention provides a massage chair, and the technical solution of which is as follows:

As shown in FIG. 1 and FIG. 2, the massage chair includes a seat A and a driving device arranged under the seat A. The driving device includes a base plate 1, a connecting frame 2, an up-and-down vibration device 3 and a four-bar linkage device 4. The bottom of the seat A is fixed with a connecting rod 8 and rolling wheels (5). The connecting rod 8 is hinged with the connecting frame 2. The surface of the rolling wheels 5 rolls to be in contact with the connecting frame 2. The up-and-down vibration device 3 and the four-bar linkage device 4 are arranged on the base plate 1. The bottom of the up-and-down vibration device 3 is connected with the connecting frame 2. The four-bar linkage device 4 is hinged with the connecting frame 2. The up-and-down vibration device 3 drives the connecting frame 2 to move.

Figure 3:
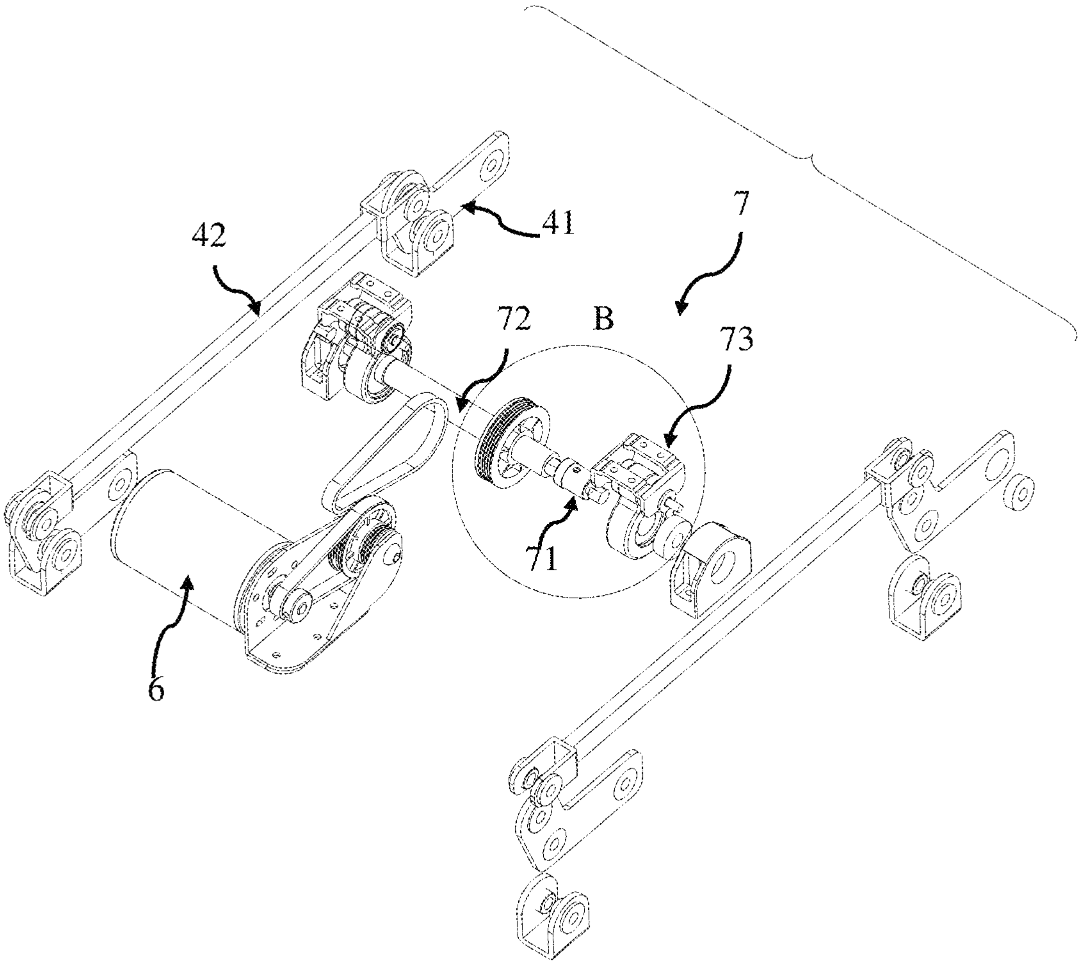
FIG. 3 is the explosion diagram of FIG. 2 with the base plate and connecting frame removed.
Figure 4:
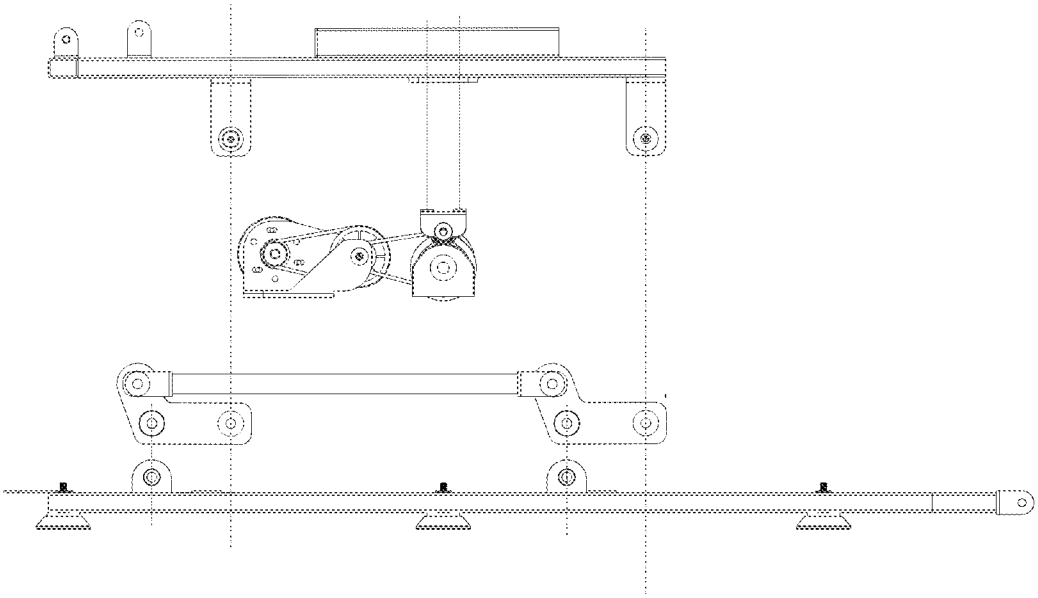
FIG. 4 is the front view of FIG. 3, which is used to illustrate the corresponding relationships.

As shown in FIG. 3, in practice, the power device 6 is set as a motor, and the power device 6 rotates through the synchronous belt driven wheel 75. The driven wheel 75 is fixedly connected with the drive shaft 72. They can be cast in one piece here or can be connected with a key or a pin. The rotating driven wheel 75 further drives the drive shaft 72 to rotate together.

As shown in FIGS. 3, 4, 5, 6 and 7, the drive shaft 72 is equipped with an eccentric wheel 71, and the outer surface of the eccentric wheel 71 is connected with the bearing and the bearing is installed in the bearing hole of swinging base 74. The rotation of the drive shaft 72 will drive the eccentric wheel 71 to rotate together, and the outer surface of the eccentric wheel 71 will drive the bearing to perform eccentric movement. The bearing is installed in the bearing hole, so the bearing drives the swinging base 74 to move up and down. The another bearing hole of the swinging base 74 is connected with the connecting piece 73 through the shaft shoulder screw, so the swinging base 74 drives the connecting piece 73 to move up and down. The top of the connecting piece 73 is fixedly connected with the connecting frame 2, so the eccentric wheel 71 drives the connecting frame 2 to move up and down.

Figure 5:
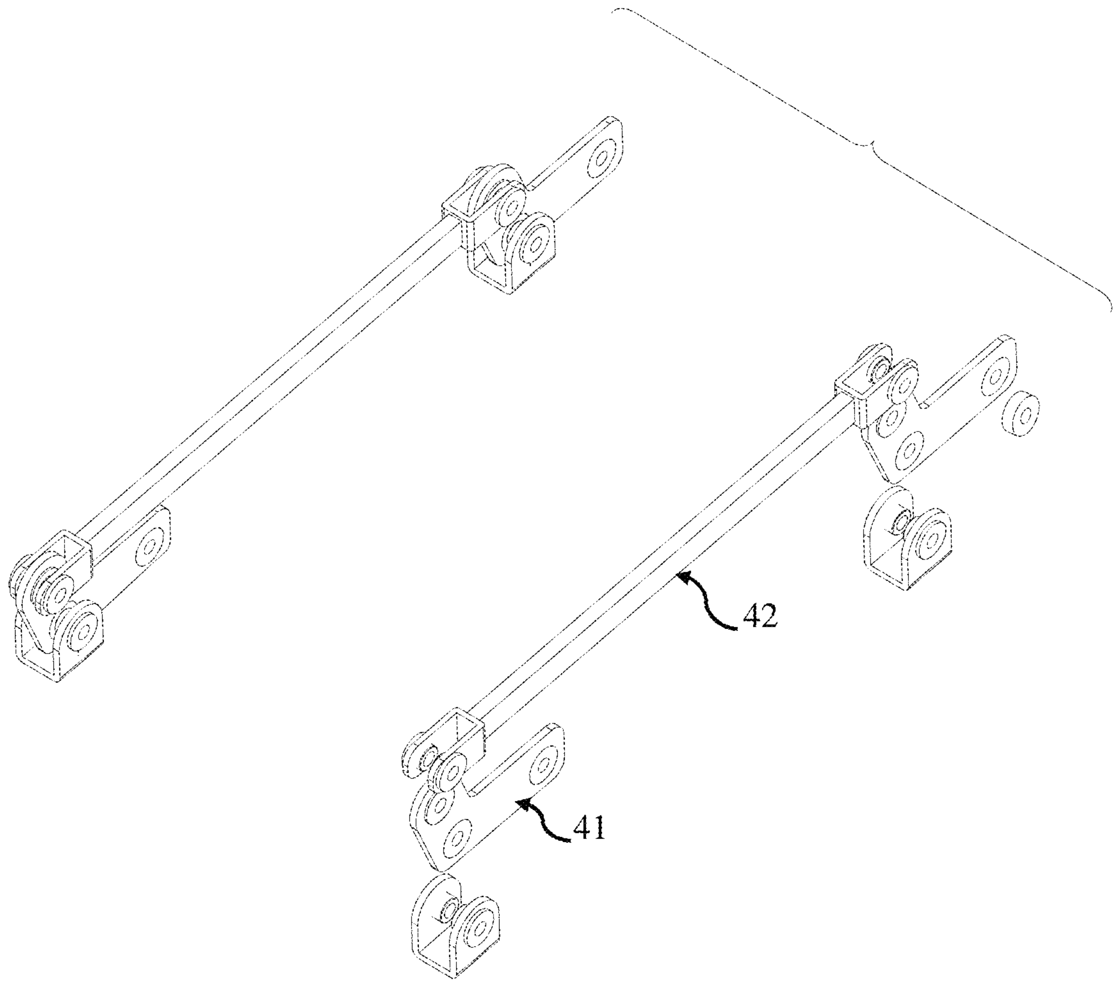
FIG. 5 is the explosion diagram of the V-shaped rod and the cross-bar.
Figure 6:
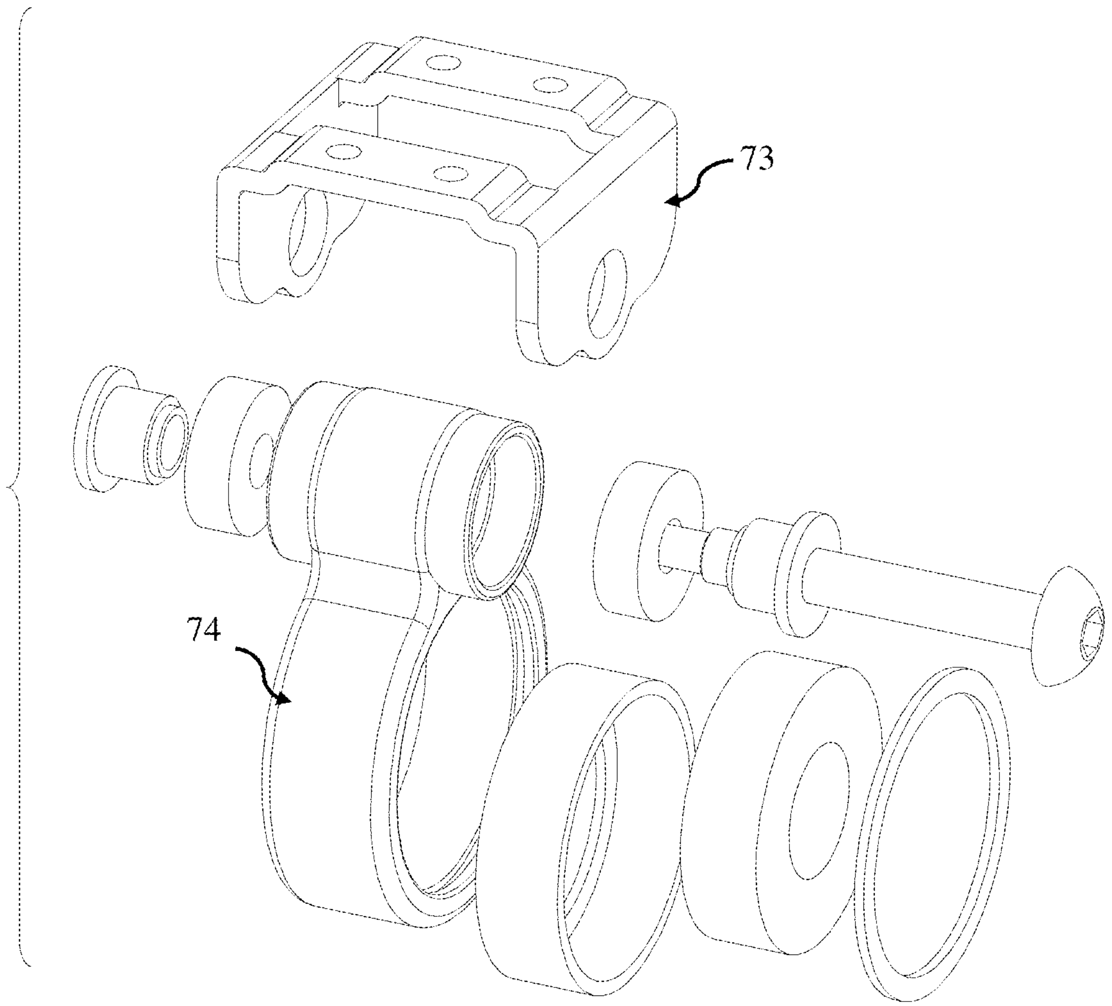
FIG. 6 is the explosion diagram of the eccentric mechanism.
Figure 7:
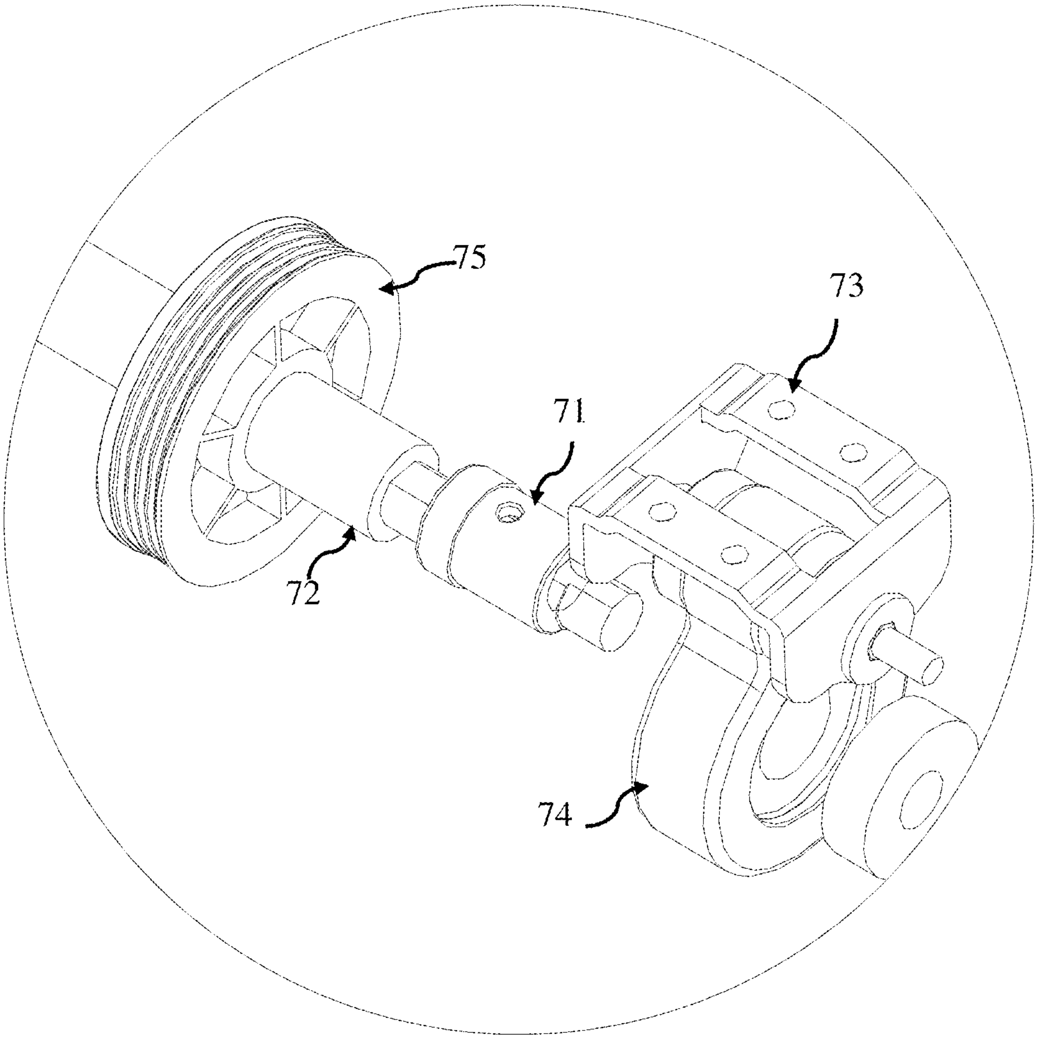
FIG. 7 is the partial enlarged diagram of position B in FIG. 3.

As shown in FIG. 5, when the connecting frame 2 moves up and down, the long side of the V-shaped rod 41 hinged with the connecting frame 2 is driven by the connecting frame 2 to move up and down together. Because the middle of the V-shaped rod 41 is hinged with the base plate 1, and the short side of the V-shaped rod 41 is connected with the cross-bar 42, the upper part of the whole massage chair is actually placed on the connecting rod 8. Because the V-shaped rod 41 has three hinged points forming the connecting rod 8, it can be ensured that at least two points are moving in consistent under the drive of the cross-bar.

In order to ensure the stability of the massage chair in actual operation, two four-bar linkage devices 4 are provided and the entire upper part of massage chair is set up on the four-bar linkage devices 4. Two four-bar linkage devices 4 can make sure to drive the massage chair and increase the bearing capacity of the massage chair at the same time. Meanwhile, because the two cross-bars are parallel to each other in actual operation, it ensures that the whole massage chair vibrates consistently.

In order to adapt to different ground environments, foot cup 9 is set under the base plate 1, which can easily adjust the respective heights of the four feet to adapt.

The bottom of the seat A is fixedly provided with a connecting rod 8 and rolling wheels 5. The connecting rod 8 is hinged with the connecting frame 2, and the surface of the rolling wheels 5 rolls to be in contact with the connecting frame 2.

The setting of the rolling wheels 5 makes the connection between the seat A and the connecting frame 2 smoother and improves the user's experience.

For better user's experience, the massage chair is also equipped with a pressure sensor on the seat A, which is set on the part of the seat corresponding to the buttock. When the pressure sensor senses that there is a continuous weight, it can regulate the speed of the motor, so as to regulate the frequency of up-and-down vibration. When the pressure sensor does not sense the weight, the motor can only run at the specified speed.

It can be understood that the above specific description of the present invention is only used to illustrate the invention and is not limited to the technical solutions described in the embodiments of the invention. Ordinary technicians in the field should understand that the invention can still be modified or equivalently replaced to achieve the same technical effect.

The invention claimed is:

1. A massage chair, including a seat and a driving device arranged under the seat, wherein the driving device includes a base plate, a connecting frame, an up-and-down vibration device and a four-bar linkage device, and a bottom of the seat is fixed with a connecting rod and rolling wheels, the connecting rod is hinged with the connecting frame, a surface of the rolling wheels rolls to be in contact with the connecting frame, the up-and-down vibration device and the four-bar linkage device are arranged on the base plate, the bottom of the up-and-down vibration device is connected with the connecting frame, the four-bar linkage device is hinged with the connecting frame, the up-and-down vibration drives the connecting frame to move.

2. The massage chair according to claim 1, wherein the up-and-down vibration device includes a power device and an eccentric mechanism, and the power device drives the eccentric mechanism to move, the eccentric mechanism includes an eccentric wheel, a drive shaft and a connecting piece, the eccentric wheel is fixedly mounted on the drive shaft, the eccentric wheel drives the connecting piece to move up and down, the power device drives the drive shaft to rotate, the drive shaft drives the eccentric wheel to rotate, the top of the connecting piece is fixedly connected with the connecting frame.

3. The massage chair according to claim 2, wherein the eccentric mechanism further includes a swinging base, and the swinging base has two bearing holes, one of which connects with connecting piece through a bearing and a shaft shoulder screw, the eccentric wheel is connected with another bearing hole through a bearing.

4. The massage chair according to claim 3, wherein the drive shaft is further provided with a driven wheel, and the driven wheel is connected with the power device through a synchronous belt.

5. The massage chair according to claim 1, wherein the four-bar linkage device includes a cross-bar and at least two V-shaped rods, and the V-shaped rod includes a short side and a long side, the two ends of the cross-bar are respectively hinged with the short side of the V-shaped rod, the middle of the V-shaped rod is hinged with the base plate, the long side of the V-shaped rod is hinged with the connecting frame.

6. The massage chair according to claim 5, wherein at least two four-bar linkage devices are arranged on the base plate.

7. The massage chair according to claim 2, wherein at least two eccentric wheels are arranged on the drive shaft.

8. The massage chair according to claim 1, wherein a foot cup is arranged under the base plate.

9. The massage chair according to claim 1, wherein a pressure sensor is arranged on the seat.

* * * * *